United States Patent [19]
Stidolph

[11] 3,883,990
[45] *May 20, 1975

[54] METHOD AND APPARATUS FOR PACKING, SHIPPING AND MARKETING OF PERISHABLE PRODUCTS SUCH AS CUT FLOWERS

[76] Inventor: David L. Stidolph, P.O. Box 158, Salinas, Calif. 93901

[ * ] Notice: The portion of the term of this patent subsequent to Aug. 28, 1990, has been disclaimed.

[22] Filed: Mar. 28, 1973

[21] Appl. No.: 345,739

Related U.S. Application Data

[63] Continuation-in-part of Ser. No. 173,421, Aug. 20, 1971, Pat. No. 3,754,642.

[52] U.S. Cl. .................. 47/58; 47/34.11; 206/423
[51] Int. Cl. ...................... A01g 5/00; B65d 85/50
[58] Field of Search .......... 47/34.11, 41, 58, 41.11, 47/DIG. 2; 206/45.14, DIG. 9, 423; 229/3.1, 31 FS, 51 D

[56] References Cited
UNITED STATES PATENTS

| | | | |
|---|---|---|---|
| 1,176,932 | 3/1916 | Smith | 206/45.14 |
| 1,270,554 | 6/1918 | Rubel | 47/34.11 X |
| 1,296,158 | 3/1919 | Bonham | 206/45.14 |
| 1,739,462 | 12/1929 | Hunt et al. | 47/41.11 |
| 2,085,458 | 6/1937 | Walker | 47/41 UX |
| 2,094,389 | 9/1937 | Walker | 47/41 UX |
| 2,278,198 | 3/1942 | Hall | 47/DIG. 2 |
| 2,309,742 | 2/1943 | Ballard et al. | 47/34.11 X |
| 3,127,011 | 3/1964 | Weddle | 206/46 PL |

FOREIGN PATENTS OR APPLICATIONS

| | | | |
|---|---|---|---|
| 45,870 | 5/1888 | Germany | 47/41 |

*Primary Examiner*—Edgar S. Burr
*Assistant Examiner*—Paul T. Sewell
*Attorney, Agent, or Firm*—Ben J. Chromy; Gerald L. Moore

[57] ABSTRACT

An improved method and apparatus for packing, shipping and marketing of perishable products such as cut flowers. The cut flowers are placed into a water-proof box body. Long stem cut flowers are placed into this box body lengthwise and short stem cut flowers are gathered into bunches and placed into skeleton containers called hampers which are taken into the field and into which the workman places a plurality of bunches of cut flowers. These hampers are of such size that they fit into the box body side by side. In cases where the hampers are taller than the box body an insert which is taller than the flower bunches is placed into the box body. The box body is provided with a cover and the cover is provided with a plurality of rows of scored areas; the scoring in these areas is such that holes may be punched through the box cover. After the box and cut flowers contained therein reach the destination at which the flowers are to be placed on display for sales purposes, they are removed from the box body and a small quantity of water is placed therein. A suitable arrangement of wire, cardboard, water absorbent material or the like is placed into the box body so that it floats on the surface of the water. The cover is provided with holes at the scored areas so that the bunches of flowers removed from the box body may be inserted into the holes after the cover. The cover is then placed on the box body and the bunches of flowers are inserted into the holes formed in the cover so that the cut ends of the flowers enter the grid or water absorbent material and are immersed in the water. The grid or water absorbent material hold the cut flowers in erect position during the display thereof in the market place.

6 Claims, 11 Drawing Figures

3,883,990

METHOD AND APPARATUS FOR PACKING, SHIPPING AND MARKETING OF PERISHABLE PRODUCTS SUCH AS CUT FLOWERS

DESCRIPTION OF THE INVENTION

This application is a Continuation-in-Part of my Application Ser. No. 173,421, now U.S. Pat. No. 3,754,642, filed Aug. 20, 1971.

This invention relates to an improved method and means for the packing, shipping and marketing of perishable products such as cut flowers.

An object of this invention is to provide an improved process and means for packing, shipping and displaying of cut flowers so that the life is prolonged and the appearance thereof is improved so that the value thereof at the market place is increased.

Another object of this invention is to provide an improved shipping container arrangement for use with cut flowers that reduces the handling of the cut flowers in packing them for shipping and thus reduces the damage thereto so that the cut flowers arrive at the market place in optimum condition.

Another object of this invention is to provide an improved container arrangement that may be used for shipping and display of cut flowers, said container arrangement being provided with a cover that has a plurality of holes formed therein into which bunches of flowers may be inserted and said container arrangement also including means placed into the bottom thereof that floats on water placed in said bottom so that the cut ends of the flowers are immersed in the water and said means holds the long stem cut flowers in erect position during the display thereof for sales purposes.

Other and further objects of this invention will be apparent to those skilled in the art to which it relates from the following specification, claims and drawing.

In this invention I have provided an improved method or process and means for the harvesting, shipping and display of perishable products such as cut flowers. The harvesting of flowers in the field or greenhouse requires the workman to cut the selected flowers from the plants and arrange these in bunches which are collected in hampers that are skeleton containers having an open bottom and top. Ordinarily these hampers are taken to a packing table where the bunches are removed from the hampers and subjected to further handling before being packed for shipment. In order to eliminate this further handling I utilize the hamper as part of a shipping container and I have constructed a box arrangement that receives one or more of these hampers filled with flowers and the flower bunches are held therein in erect position. This container arrangement includes a box body made of waterproof material into which an insert is placed such that the top of the insert is above the tops of the flower bunches.

Another important feature of my invention includes an arrangement for holding the flowers in erect position in the display box. This feature is especially useful in the display of long stem cut flowers.

Further details and features of this invention will be set forth in the following specification, claims and drawing:

Figure 2:
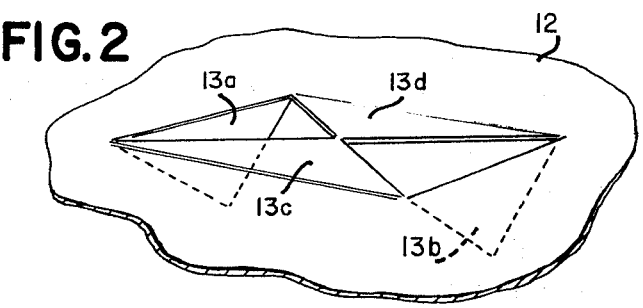
FIG. 2 is a fragmentary view showing two opposing flaps in a scored area of the cover bent inward to provide flower-receiving holes.
Figure 3:
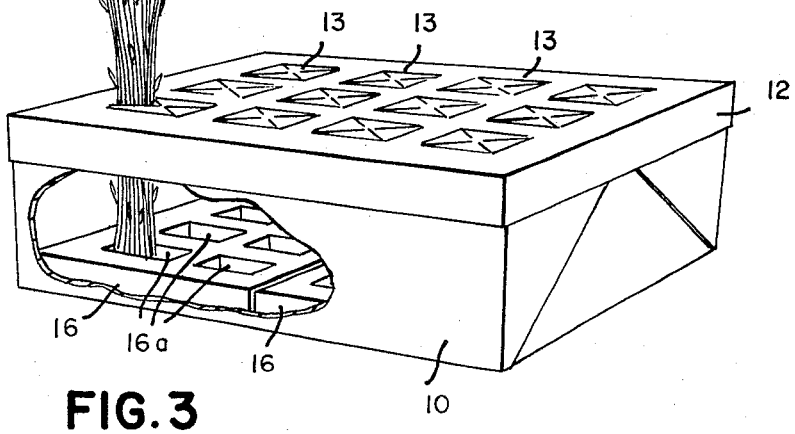
FIG. 3 is a view of the cut flower box as used for display and a part of the box is cut away to show the interior thereof.

Referring to the drawing in detail, reference numeral 10 designates a box body of corrugated cardboard or the like which has been made waterproof by giving it a coating of wax, plastic, epoxy resin or the like. A side of the box has been broken away to show one of the plurality of bunches of long stemmed flowers 11 positioned therein for shipping to a sales outlet or other destination. The box is provided with a cover 12 which has a plurality of rows of scored areas 13. Each of the scored areas comprise cuts radiating from an uncut center and define flaps which may be bent inward on the boundary scoring after the uncut center is severed as shown in FIG. 2 to provide holes for receiving flower stems as shown in FIG. 3. Each of the scored areas 13 is provided with cross-shaped cuts which are interrupted at the centers of the areas where the cuts would normally cross so that the centers of these areas are left unscored. Thus when the flaps 13a and 13b, for example, are to be folded inward the apexes of these flaps must be severed or broken in order to free the flaps for folding inward. Two opposing holes may be formed at each scored area and each of these holes is adapted to receive one small bunch of flowers. The flaps 13c and 13d may also be folded inward where a larger hole is desired for accommodating a larger bunch of flowers. In order to fold the flaps 13c and 13d inward the apexes thereof also must be severed. The cover 12 is somewhat larger than the size of the box 10 and the skirt 12a provided to the cover is adapted to embrace the outside of the box 10 when the cover is placed thereon.

Figure 4:
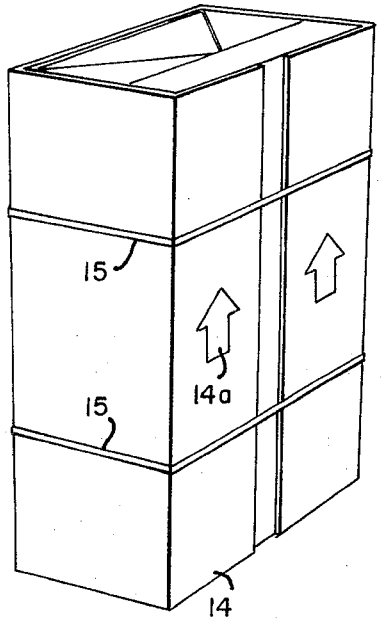
FIG. 4 is a perspective view of the cut flower carrier shown in FIG. 1 with the outer wrapping enclosing the sides of the box.
Figure 1:
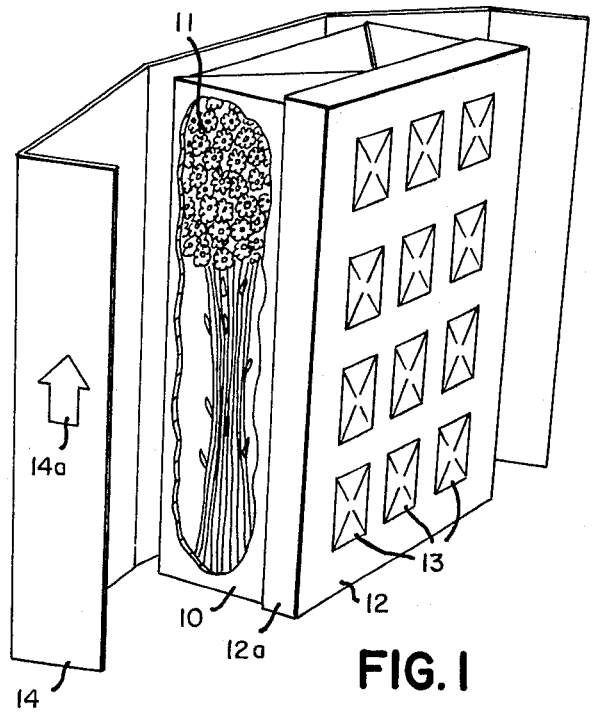
FIG. 1 is a view of an embodiment of this invention showing the cut flower carrier partially open and also partially cut away.

The box 10 is of elongated shape to receive the long stemmed cut flowers 11 which are placed therein length-wise as shown in FIG. 1 and the box is then erected on one of its sides so that the cut flowers are standing erect therein. With the flowers upright in the box the cardboard or plastic sleeve 14 which is porous is wrapped around the box as shown in FIG. 4 and suitable markings 14a are placed thereon to indicate the orientation in which the box should be shipped in order that the flowers therein are flower end up instead of being upside down. Suitable bands 15 of metal, plastic or cord are placed around the sleeve 14 to hold this sleeve securely in place around the box.

After the flowers are shipped to their destination which may be a supermarket, flower shop or other sales outlet, sleeve 14 is removed from the box and the flowers 11 are also removed therefrom. The box 10 is placed on its bottom as shown in FIG. 3 and a small quantity of water is placed therein. In addition apertured cardboard frame members 16 are positioned in the water which has been placed into the box. Frame members 16 have a plurality of holes 16a and the number of these holes is preferably the same as the number of scored areas 13 in the cover of the box so that one of the holes 16a will be opposite to a scored area in the cover. Each of the scored areas 13 will have a hole 16a opposing it. Thus, when the flaps defined by the cuts in the cover are folded inward bunches of flowers may be inserted into the holes provided in these scored areas. The lower ends of the cut flowers are positioned in the water in holes 16a and the flowers are held in upright position. The members 16 thus serve to hold the cut flowers in upright position so that none of the flowers can tilt and fall. This arrangement provides a well ordered flower display in the marketplace and it also prevents the cut ends of the stems from being withdrawn from the water since it prevents the flowers from falling.

Figure 5:
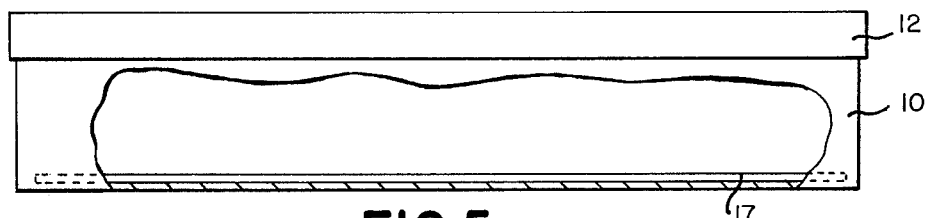
FIG. 5 is a side view partially cut away of the box with an insert on the bottom thereof which is provided with a plurality of rows of holes.
Figure 6:
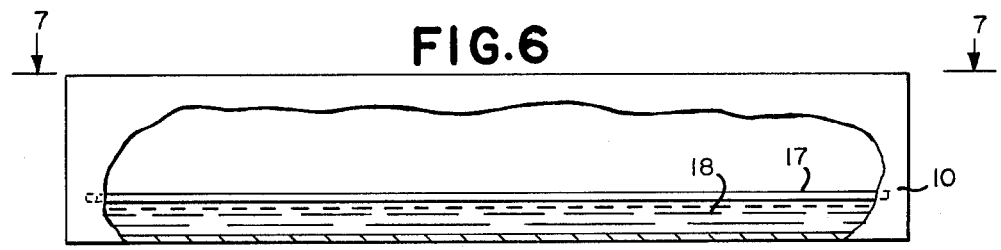
FIG. 6 is a view similar to FIG. 5 showing the box with a small quantity of water placed therein and showing the insert floating on the top of the water.
Figure 7:
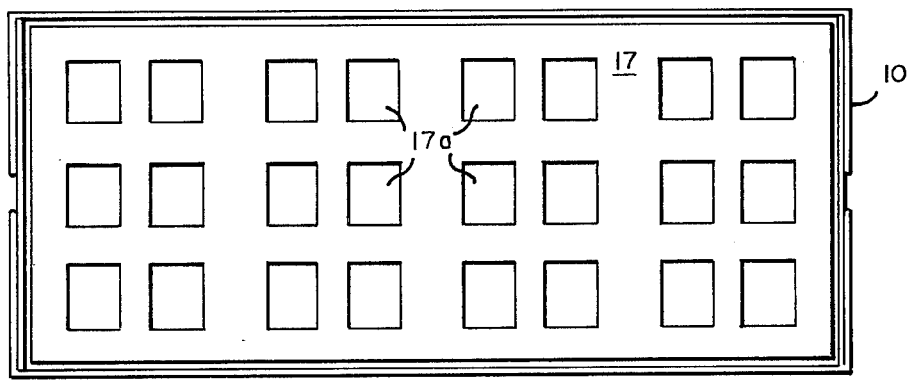
FIG. 7 is a view taken along the lines 7—7 of FIG. 6 showing the insert and the rows of holes provided thereto.
Figure 8:
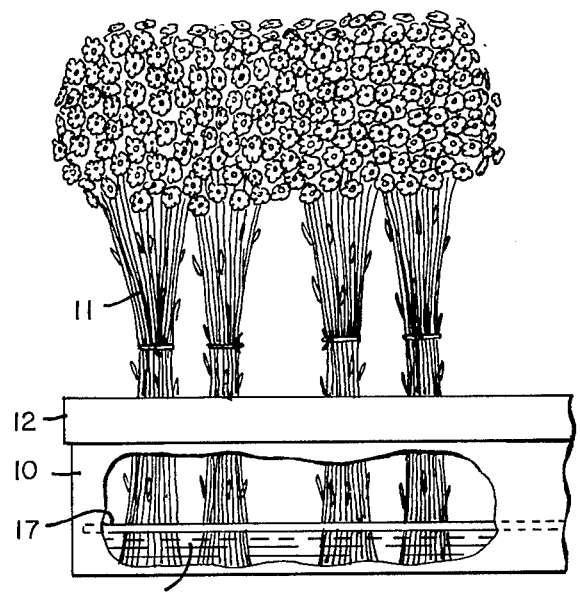
FIG. 8 is a fragmentary view of the box shown in FIGS. 5, 6 and 7 partially broken away and showing several bunches held in erect position in the box with the flower ends extending above the cover and the cut ends extending into the water through the holes in the insert.

The box 10 may be provided with a sheet 17 of water absorbent material such as paper or the like. This material is placed into the box before the flowers are inserted therein for shipping as shown in FIG. 5. After the flowers are removed from the box at their destination and water 18 is placed into the box the sheet of water absorbent material 17 rises to the surface of the water as shown in FIG. 6. The sheet 17 may be provided with holes 17a as shown in FIG. 7 so that the cut ends of the flowers may be inserted into these holes as shown in FIG. 8 when the flowers are arranged for display and sale. In this way the sheet 17 serves to hold the flower bunches in upright position. In cases where the sheet 17 is of paper such as newsprint which is easily pierced by the flower stems when the paper becomes waterlogged then it is not necessary to form holes such as the holes 17a, particularly where there are only a few stems in each bunch.

Figure 10:
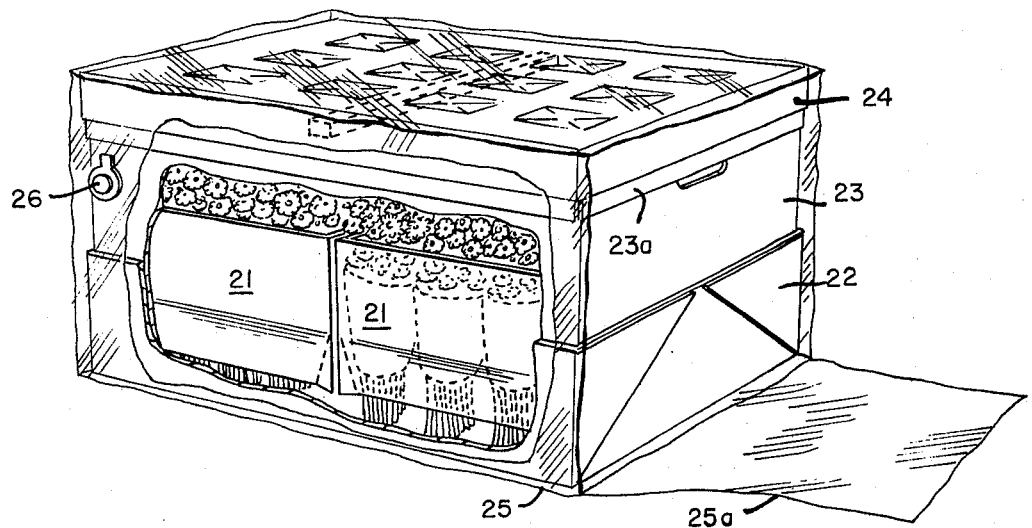
FIG. 10 is a view of the cut flower carrier enclosed in a plastic bag adapted for use with hampers and this view is partially cut away in order to show the flower hampers inside of the carrier.
Figure 11:
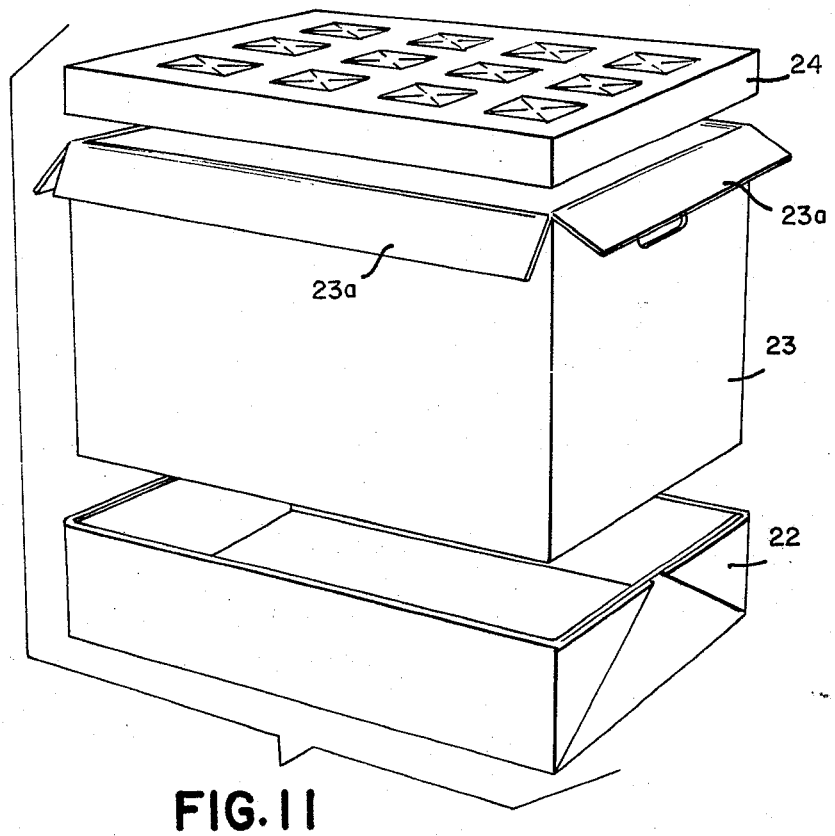
FIG. 11 is an exploded view of the carrier shown in FIG. 10.

A frame member 19 of wood, cardboard or the like, which is provided with a grid or webbing 20 made of separated criss-crossing wire, strings or the like, may be provided to the box 10 in place of the sheet 17. The frame 19 being of wood, cardboard or the like, will float on the water 18 so that the grid or webbing 20 is supported on the surface of the water and the cut ends of the stems of the flowers may be inserted therethrough whereby the flowers will be held in upright position and the cut stems thereof immersed in the water 18.

Where the cut flowers are placed in hampers 21 by workers harvesting the flowers these hampers and the bunches of flowers placed therein by the workers may be shipped in the boxed arrangement shown in the FIGS. 10 and 11. In this case the hampers 12 are placed into the box 22 which corresponds to the box 10 shown in FIG. 1 and inasmuch as the hampers 21 are higher than the box 22 an insert 23 of corrugated cardboard or the like is placed into the box. The lower part of the insert 23 fits snugly into the box 22 and the upper part thereof which is well above the tops of the flowers, is provided with flaps 23a. Flaps 23a are folded down against the outside of the insert all the way around so that these flaps fit snugly into the cover 24 when the cover is placed thereover. This arrangement therefore accommodates two of the hampers 21 and these hampers with the cut flowers therein may be positioned directly in the box 22 and insert 23 without necessitating additional handling of the flower bunches such as removal of the flower bunches from the hampers. This not only saves time in packing the flowers for shipping but it also eliminates damaging the flowers such as may be caused by removing them from the hampers and packing them in other boxes for shipping. After the hampers of cut flowers are placed into the box 22 and insert 23 the cover 24 is placed on the top of the insert. The cover 24 is the same as the cover 12 shown in FIG. 1 and it is also provided with rows of scored areas so that holes may be formed at these scored areas for receiving the flower stems for display and sale of the flowers in the market place.

The box with the cut flowers is inserted into a plastic bag 25 and flap 25a is then sealed to the body of the bag with suitable adhesive tape. The bag 25 is provided with a plurality of air vents such as indicated at 26 and suitable plastic tubes (not shown) may be inserted into selected ones of these vents to admit a gas preservative for the flowers. Admitting this gas through selected vents causes the air oxygen to be vented through the others of these vents so that the flowers are in an atmosphere such as will prolong their life. Suitable pads which contain chemical scrubbers such as potassium permanganate to remove toxic gases such as ethylene given off by the flowers may be attached in the box to the inner surface of the cover 24 by suitable adhesive tape.

Providing the insert 23 to the box body 22 not only increases the strength of the shipping container but it also makes it possible to use a smaller box body 22. This results in a saving because body 22 is of waterproof material whereas the insert 23 is not.

Figure 9:
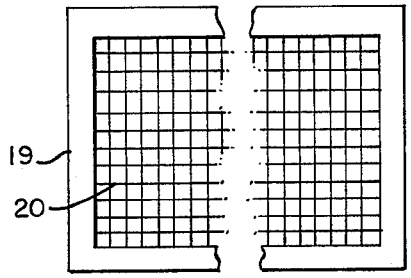
FIG. 9 is a modified form of insert employing a wire or cord grid attached to a frame for holding the flowers erect, said insert being adapted to be used in the boxes shown in FIGS. 5–8.

After the container shown in FIGS. 10 and 11 is shipped to the selected destination at which the cut flowers are to be displayed and sold the hampers 21 and flowers are removed. Holes are provided in the scored areas of the cover 24 and a small quantity of water is placed into the box body 22. A water-pervious member such as indicated at 16, 17 and 19 in FIGS. 3, 8 and 9, respectively, is floated on the water. The cut flower bunches are then inserted into the holes in the cover so that their cut ends extend through said member into the water as shown in FIGS. 3 and 8. The water-pervious member serves to hold the cut flowers erect in well defined bunches and prevents individual flowers from tilting toward the cover in random manner especially after some of the bunches have been sold and removed. Thus the ordered appearance of the display is maintained until all bunches are removed.

While I have shown and described a preferred form of the invention it will be apparent that the invention is capable of variation and modification from the form shown so that the scope thereof should be limited only by the proper scope of the claims appended hereto.

What I claim is:

1. In the process of transporting and displaying of cut flowers, the steps comprising providing a box body of substantially waterproof material, providing a cover for the box body, scoring predetermined areas of said cover, placing a plurality of bunches of cut flowers into said box body, placing said cover on said box body, transporting said covered box body, and flowers therein to a selected sales outlet for the flowers, removing the cover from the box body, forming holes in said cover at said predetermined scored areas, removing the flowers from said box body, placing a predetermined amount of water into said box body, placing said cover on said box body, inserting said bunches of cut flowers into said holes, immersing the cut ends of said flowers into the water in said box body and displaying said cut flowers at said sales outlet upright in the holes in said cover.

2. In the process of transporting and displaying of cut flowers, the steps comprising providing a box body of substantially waterproof material, providing a cover for the box body, scoring predetermined areas of said cover, placing a plurality of bunches of cut flowers into said box body, placing said cover on said box body, transporting said covered box body and flowers therein to a selected sales outlet for the flowers, removing the cover from the box body, forming holes in said cover at said predetermined scored areas, removing the flowers from said box body, placing a predetermined amount of water into said box body, placing a floatable water-absorbent member having openings therein into said box body, placing said cover on said box body, inserting said bunches of cut flowers into said holes, immersing the cut ends of said flowers through said water-absorbent member into the water in said box body and displaying said cut flowers at said sales outlet upright in the holes in said cover.

3. In an article of manufacture for the transportation and display of cut flowers, the combination comprising a box body of substantially waterproof material, at least one hamper positioned in upright position in said box body, said hamper for holding a plurality of bunches of cut flowers in upright position so that the flower ends thereof extend above said box body, an insert positioned in said box body adjacent the inner sides thereof, said insert having a top extending above the flower ends of said cut flowers, a cover, said cover having a skirt encompassing said top of said insert, said cover having a plurality of rows of scored areas at which holes are formed after the cut flowers are transported to a selected destination and removed from said box body, a predetermined quantity of water placed in said box body after the cut flowers are removed therefrom, said cover being positioned on said box body and said cut flower bunches being positionable in the holes in said cover with the cut ends thereof in said water so that the cut flowers may be displayed in a predetermined arrangement over said cover.

4. In an article of manufacture for the transportation and display of cut flowers, the combination as set forth in claim 3, further comprising a floatable water-absorbent member having openings therein positioned in said box body such that the cut ends of the flowers may project through said water-absorbent member into said water, said water-absorbent member and the edges around the holes in said cover for holding the flowers erect over said cover for display thereof.

5. In an article of manufacture for the transportation and display of cut flowers, the combination comprising a box body of substantially waterproof material, said box body for receiving a plurality of bunches of cut flowers, a cover, said cover having a skirt encompassing said top of said box body, said cover having a plurality of rows of scored areas at which holes are formed after the cut flowers are transported to a selected destination and removed from said box body, a floatable water-absorbent member having openings therein positioned in said box body in a predetermined quantity of water which is placed in said body after the flowers are removed therefrom at said destination, said cover being positioned on said box body and said cut flowers being positioned in the holes in said cover with the cut ends thereof in said water and said water-pervious member, said water-absorbent member for holding said cut flowers erect for display thereof.

6. In an article of manufacture for the transportation and display of cut flowers, the combination as set forth in claim 3, further characterized in that said box body and flowers placed therein are enclosed in a flexible bag with an atmosphere therein conducive to prolonging the life of the flowers.

* * * * *